United States Patent
Doan Huu

(10) Patent No.: US 12,493,826 B2
(45) Date of Patent: Dec. 9, 2025

(54) AUTOMATIC MACHINE LEARNING FEATURE BACKWARD STRIPPING

(71) Applicant: SAP SE, Walldorf (DE)

(72) Inventor: Jacques Doan Huu, Montigny le Bretonneux (FR)

(73) Assignee: SAP SE, Walldorf (DE)

( * ) Notice: Subject to any disclaimer, the term of this patent is extended or adjusted under 35 U.S.C. 154(b) by 693 days.

(21) Appl. No.: 17/956,120

(22) Filed: Sep. 29, 2022

(65) Prior Publication Data
US 2023/0026391 A1    Jan. 26, 2023

Related U.S. Application Data

(63) Continuation of application No. 16/868,145, filed on May 6, 2020, now Pat. No. 11,494,699.

(51) Int. Cl.
*G06N 20/00* (2019.01)

(52) U.S. Cl.
CPC .................. *G06N 20/00* (2019.01)

(58) Field of Classification Search
CPC ................................... G06N 20/00
See application file for complete search history.

(56) References Cited

U.S. PATENT DOCUMENTS

| | | | |
|---|---|---|---|
| 11,062,400 B1 | 7/2021 | Mccall et al. | |
| 11,315,030 B2 * | 4/2022 | Cataltepe | G06F 18/2115 |
| 11,599,826 B2 * | 3/2023 | Khurana | G06N 20/00 |
| 2021/0319354 A1 * | 10/2021 | Raz | G06F 11/3409 |
| 2021/0319363 A1 | 10/2021 | Gillberg et al. | |
| 2021/0342949 A1 | 11/2021 | Kim et al. | |
| 2021/0350273 A1 | 11/2021 | Huu | |

OTHER PUBLICATIONS

Loyola, et al, Learning Feature Representations from Change Dependency Graphs for Defect Prediction, Retrieved from Internet:<https://ieeexplore.ieee.org/abstract/document/8109101> (Year: 2017).*
Singh, et al, Feature Selection Effects on Classification Algorithms, Retrieved from Internet: <chrome-extension://efaidnbmnn-nibpcajpcglclefindmkaj/https://www.ijert.org/research/feature-selection-effects-on-classification-algorithms-IJERTV7IS020109.pdf> (Year: 2018).*
"U.S. Appl. No. 16/868,145, Notice of Allowance mailed Jun. 29, 2022", 10 pgs.

* cited by examiner

*Primary Examiner* — Miranda M Huang
*Assistant Examiner* — Bart I Rylander
(74) *Attorney, Agent, or Firm* — SCHWEGMAN LUNDBERG & WOESSNER, P.A.

(57) ABSTRACT

Features are used to train one or more ML models in a modelling layer. In a feature selection layer, each generated ML model is analyzed to determine, for each input feature, a degree of importance of the feature on the results generated by the ML model. Features with low importance are identified and the information is propagated backward to the data source and feature engineering layers. In response, the data source and feature engineering layers refrain from gathering or generating the unimportant features. Based on a confidence measure of the determination that each feature is important or unimportant, a number of periods between reevaluation of the feature importance is determined. After the number of periods has elapsed, a removed feature is restored to the pipeline.

20 Claims, 12 Drawing Sheets

| 410 → | ACTIVATION TABLE ||||
|---|---|---|---|---|
| 420 → | NODE | FEATURE | TIME | ACTIVE |
| 430A → | N2 | NULL | 2020-01-01 12:20:50 | TRUE |
| 430B → | N3 | NULL | 2020-01-01 12:20:50 | TRUE |
| 430C → | NULL | F1 | 2020-01-02 12:20:50 | TRUE |
| 430D → | NULL | F2 | 2020-01-02 12:20:50 | FALSE |
| 430E → | NULL | F1 | 2020-01-01 12:20:50 | TRUE |
| 430F → | NULL | F2 | 2020-01-01 12:20:50 | TRUE |

*FIG. 4*

AUTOMATIC MACHINE LEARNING FEATURE BACKWARD STRIPPING

CROSS-REFERENCE TO RELATED APPLICATIONS

This application is a continuation of prior application Ser. No. 16/868,145, filed on May 6, 2020, which is incorporated by reference herein in its entirety.

TECHNICAL FIELD

The subject matter disclosed herein generally relates to feature selection for machine learning. Specifically, the present disclosure addresses systems and methods to automate machine learning feature backward stripping in order to make the learning and prediction faster.

BACKGROUND

Machine Learning (ML) is an application that provides computer systems the ability to perform tasks, without explicitly being programmed, by making inferences based on patterns found in the analysis of data. ML explores the study and construction of algorithms, also referred to herein as models, that may learn from existing data and make predictions about new data. The dimensions of the input data are referred to as features.

Feature engineering is a step of generating data for use by ML. For example, available raw for electricity consumption prediction may include predicted temperature and average historical temperature for a day being predicted. However, better results may be generated by determining the average temperature to which office buildings are heated or cooled and providing the difference between the predicted temperature and the average temperature as an input feature. Thus, in the feature engineering step, this additional feature is generated from other data to be used in ML. However, the use of excessive features may slow training or limit the robustness of the resulting model on unseen data.

BRIEF DESCRIPTION OF THE DRAWINGS

Some embodiments are illustrated by way of example and not limitation in the figures of the accompanying drawings.

FIG. 4 is a block diagram of a database schema storing the feature and node activation among retrains, according to some example embodiments, suitable for use in automatic machine learning feature backward stripping.

DETAILED DESCRIPTION

Example methods and systems are directed to automatic machine learning feature backward stripping in a machine learning pipeline. Input features gathered in a data source layer and are passed through a feature engineering layer to generate additional features. The original features and engineered features are used to train one or more ML models in a modelling layer. In a feature selection layer, each generated ML model is analyzed to determine, for each input feature, a degree of importance of the feature on the results generated by the ML model.

Features with low importance are identified as "inactive" and the activation status is then propagated backwardly to all features of the data source and feature engineering layers through the dependency relationships from output to input features defined at each node of the pipeline. In response, the data source and feature engineering layers refrain from gathering or generating the inactive features, saving computation, transmission, or storage resources. Without the unimportant features as input, computation and storage resources consumed by the modeling layer are reduced.

To improve the quality of the ML models over time, the ML models are periodically regenerated using more recent training data. Based on a confidence measure of the determination that each feature is important or unimportant (active or inactive), a number of periods between reevaluation of the feature activation is determined. After the number of periods has elapsed, a removed feature is restored to the pipeline, allowing ML models to re-estimate its importance and so its activation status on more recent training data: this periodic re-evaluation of the feature activation enables to update gradually the activation rate along successive pipeline retrains.

When these effects are considered in aggregate, one or more of the methodologies described herein may obviate a need for certain efforts or resources that otherwise would be involved in training or using an ML model. Computing resources used by one or more machines, databases, or networks may similarly be reduced. Examples of such computing resources include processor cycles, network traffic, memory usage, data storage capacity, power consumption, and cooling capacity.

Figure 1:
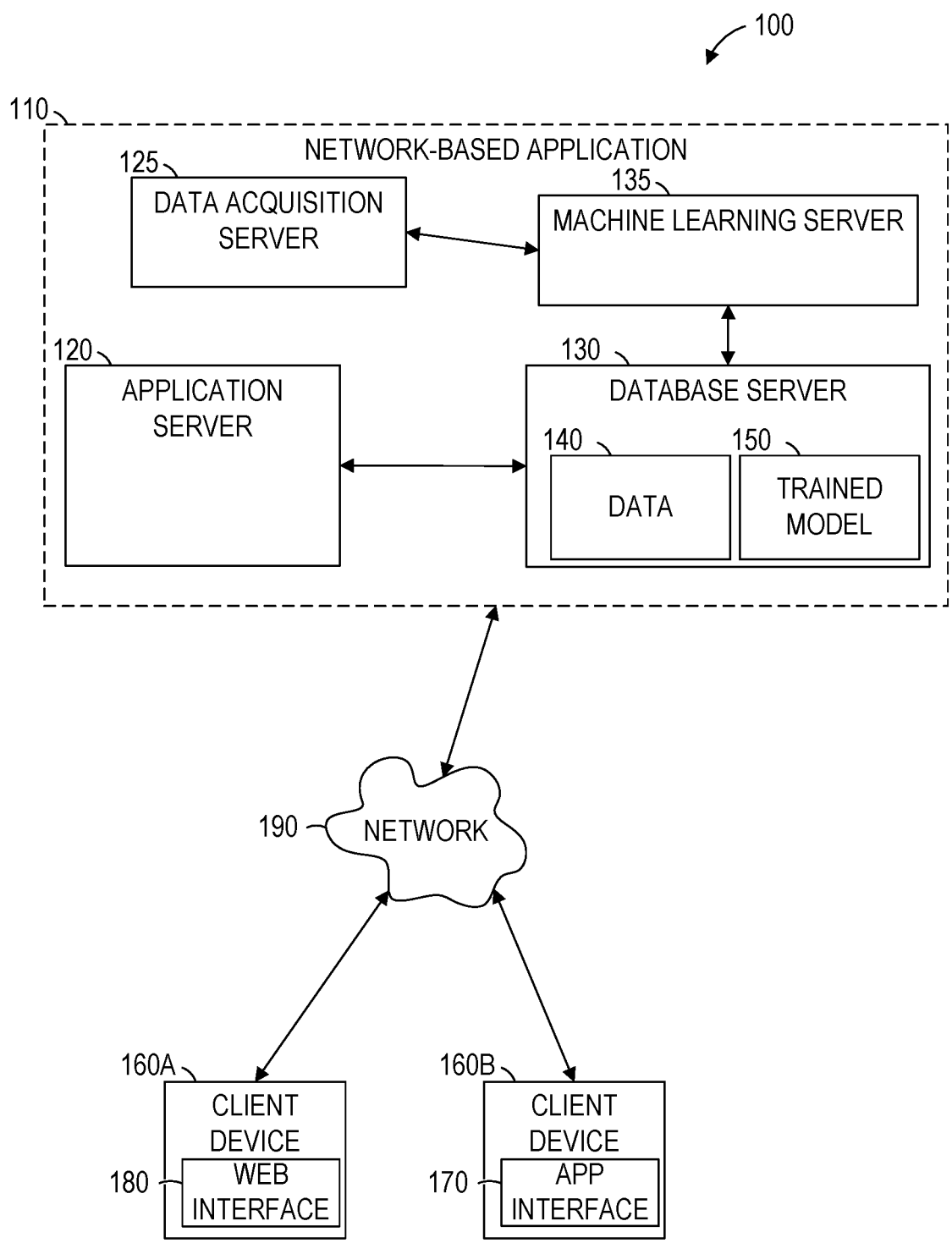
FIG. 1 is a network diagram illustrating a network environment suitable for automatic machine learning feature backward stripping, according to some example embodiments.

FIG. 1 is a network diagram illustrating a network environment 100 suitable for automatic backward feature stripping, according to some example embodiments. The network environment 100 includes a network-based application 110, client devices 160A and 160B, and a network 190. The network-based application 110 is provided by an application server 120 in communication with a database server 130, storing data 140 and a trained model 150.

The application server 120 accesses the data 140 to provide an application to the client devices 160A and 160B via a web interface 180 or an application interface 170. The application server 120, the data acquisition server 125, the database server 130, the ML training server 135, and the client devices 160A and 160B may each be implemented in a computer system, in whole or in part, as described below with respect to FIG. 11. The client devices 160A and 160B may be referred to collectively as client devices 160 or generically as a client device 160.

The data acquisition server 125 receives data from one or more data sources. The received data is provided to the ML training server 135 for feature engineering and training one or more MLs. To avoid processing uselessly data related to unimportant features and all their respective ancestors features through the dependency relationships, the ML server 135 implements automatic backward feature stripping. The trained MLs are transferred to the database server 130 and stored as the trained model 150.

The application server 120 causes the trained model 150 to process the data 140 to generate a predicted value. The predicted value is provided by the application server 120 to a client device 160 via the network 190 for display to a user. Additionally or alternatively, the predicted value is used by the application server 120 to automatically control further operations of the application server 120. For example, a credit line to a business may be automatically extended or denied based on the predicted value.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 12. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 120, the data acquisition server 125, the database server 130, the ML server 135, and the client devices 160A-160B are connected by the network 190. The network 190 may be any network that enables communication between or among machines, databases, and devices. Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
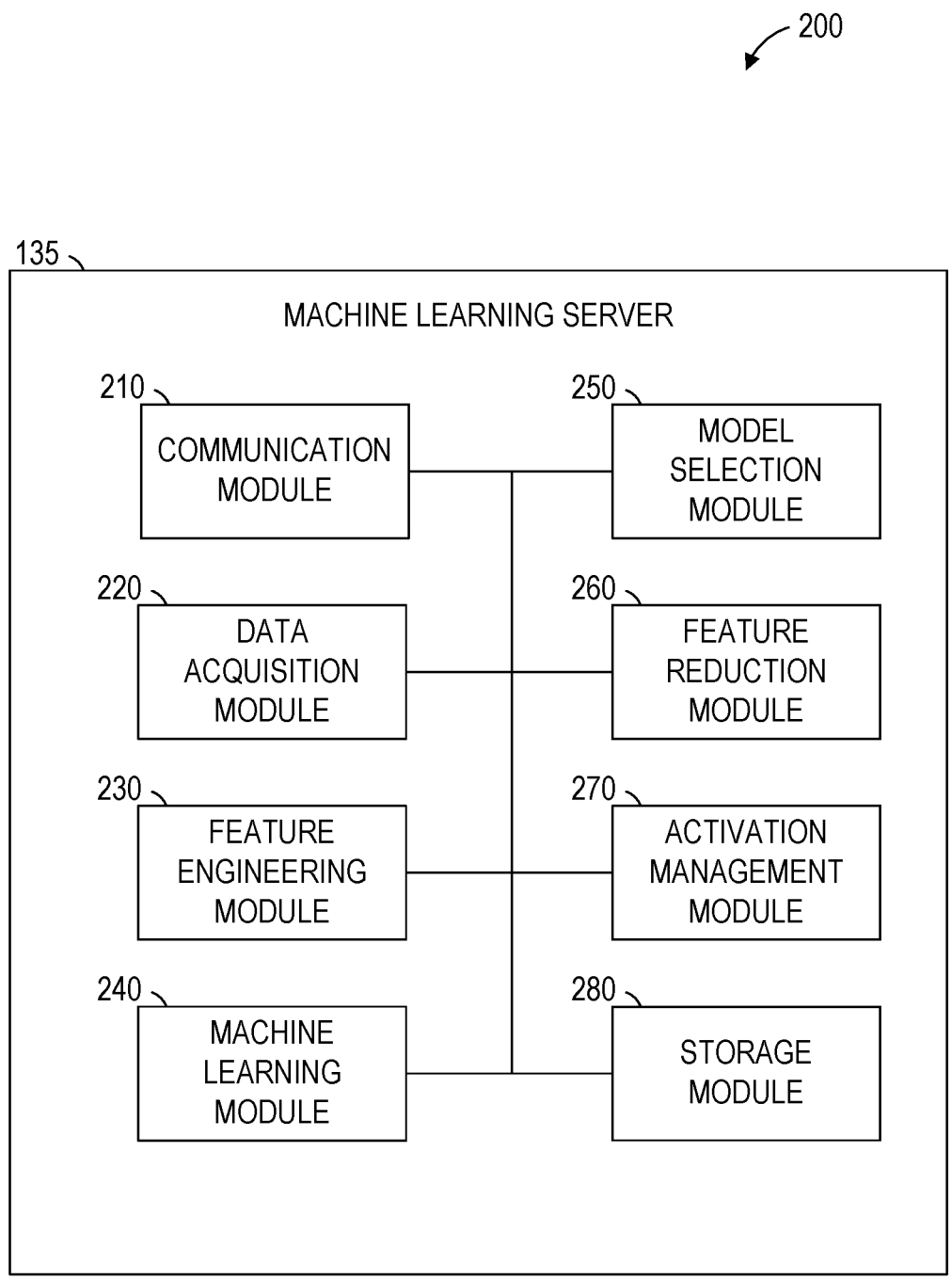
FIG. 2 is a block diagram of a machine learning server, according to some example embodiments, suitable for using automatic machine learning feature backward stripping in performing machine learning.

FIG. 2 is a block diagram 200 of the ML server 135, according to some example embodiments, suitable for using automatic machine learning feature backward stripping in performing machine learning. The ML server 135 is shown as including a communication module 210, a data acquisition module 220, a feature engineering module 230, an ML module 240, a model selection module 250, a feature reduction module 260, an activation management module 270, and a storage module 280, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 receives data sent to the ML server 135 and transmits data from the ML server 135. For example, the communication module 210 receives, from the data acquisition server 125, domain data for one or more domains (e.g., weather data, power data, data for a business unit, customer segment data, customer license data, customer meeting data, or any suitable combination thereof) and provides the domain data to the data acquisition module 220.

The data acquisition module 220 receives the domain data from the data acquisition server 125 or from multiple such data acquisition servers. The received domain data is processed by the data acquisition module 220 into a format suitable for training ML models, for feature engineering, or both.

Using the data received by the data acquisition module 220, the feature engineering module 230 generates additional features. For example, two features may be processed to generate an additional feature that is a ratio of the two features (e.g., acquired data indicating population and gross domestic product (GDP) for a set of nations may be used to generate a per-capita GDP feature for each nation). As another example, time-series data may be processed to generate an additional feature that is a first derivative of the time-series data (e.g., acquired data indicating monthly accounts receivable may be used to generate an amount of change in accounts receivable each month).

The ML module 240 builds one or more ML models using the acquired and generated features. The ML models may be of the same type using different parameters (e.g., multiple convolutional neural networks (CNNs) with different numbers of hidden layers), of different types (e.g., a gradient boosting decision tree (GBDT), a random forest, and a logistic regression), or any suitable combination thereof. The ML module 240 provides, via the communication module 210, a trained model. Additionally or alternatively, the trained model may be stored in a database or file system by the storage module 280.

Generally, training an ML model involves reducing the error of a training dataset or a validation dataset. The training dataset and the validation dataset are both sets of data for which the input features and the output value are known (also referred to as "labelled data"). A single set of labelled data may be divided into a training dataset and a validation dataset. For example, 20% of the set may be selected at random for use as the validation dataset and the remaining 80% used as the training dataset.

In a time period, multiple ML models may be trained by the ML module 240. The model selection module 250 selects one of the ML models to be used, based on an error measurement of each of the multiple ML models.

The feature reduction module 260 identifies features with low predictive value and removes them from the ML models. The activation management module 270 then back propagates from input features of modeling layer, the activation status to all ancestor features along the dependency graph: the activation status for all features and operations (nodes) are tracked over time by the activation management module 270 in order to compute the activation rate. Thus, if the ML server 135 is later invoked to update the trained model 150, the removed (inactive) features are not retrieved from the data acquisition server 125, not generated by the feature engineering module 230, not included in training the MLs by the ML module 240, or any suitable combination thereof.

Figure 3:
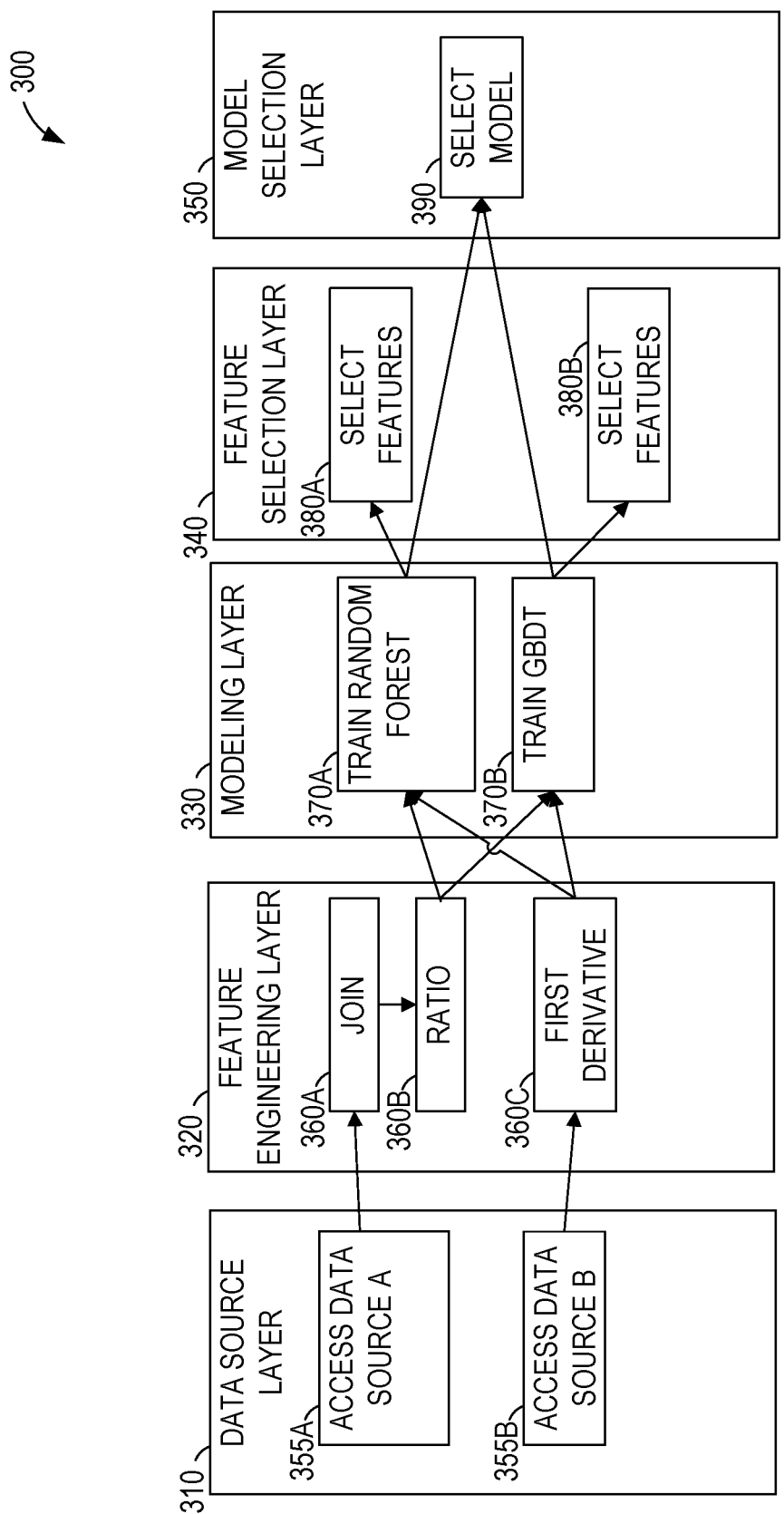
FIG. 3 is a diagram showing an example pipeline of stages performed in machine learning using automatic machine learning feature backward stripping.

FIG. 3 is a diagram showing an example pipeline 300 of layers performed in machine learning using automatic machine learning feature backward stripping. The pipeline 300 includes data source layer 310, feature engineering layer 320, modeling layer 330, feature selection layer 340, and model selection layer 350. The data source layer 310 includes acquisition operations 355A and 355B. The feature engineering layer 320 includes operations 360A, 360B, and 360C. The modeling layer 330 includes learning operations 370A and 370B. The feature selection layer 340 includes operations 380A and 380B. The model selection layer 350 includes operation 390.

In the example of FIG. 3, two ML models are trained in the modeling layer 330. In other example embodiments, one ML model is trained, three ML models are trained, or larger numbers of ML models are trained. For each ML model, one or more operations are performed in each of the layers 310-340.

Operations 355A and 355B in the data source layer 310 access data sources. For example, weather data from the National Weather Service may be accessed in operation 355A and population data from the Census Bureau may be accessed in operation 355B.

In the feature engineering layer 320, operations 360A-360C manipulate the data accessed in the data source layer 310 to generate additional features. For example, different fields from the National Weather Service may be joined in operation 360A and a ratio between the values of the fields determined in operation 360B. As another example, a first derivative of the population data from the Census Bureau may be calculated to create a population growth rate feature. The engineered features, the accessed data, or any suitable combination or sub-portion thereof is provided to the modeling layer 330, where the features are used to train ML models.

In the example of FIG. 3, a random forest ML model is trained in operation 370A and a GDBT is trained in operation 370B. After the ML models are trained, the operations 380A and 380B of the feature selection layer 340 determine which features should be used in a later retrain of the pipeline 300. The features to be used are considered "active" or "selected." The features that will not be used are considered "inactive" or "not selected."

The determination to make a feature inactive may be accompanied by a determination of how many retrains of the pipeline 300 the feature will be kept inactive. The number of retrains may be determined based on a confidence measure associated with the determination to make the feature inactive. For example, a determination that the population growth rate feature has negligible impact (e.g., an impact below a predetermined threshold) with a high degree of confidence may result in making the population growth rate feature inactive for a predetermined maximum number of pipeline retrains (e.g., 5, 10, 12, 24, or 100 retrains). As another example, a determination that a ratio of forecast temperature with average temperate has negligible impact with a low degree of confidence may result in the feature being inactive for a predetermined minimum number of retrains (e.g., 1, 2, 3, 4, or 5 retrains). The retrains may occur at a predetermined rate (e.g., hourly, daily, weekly, or monthly).

The model selection operation 390 of the model selection layer 350 determines which model should be used in the current retrain and which models should be generated in a later retrain of the pipeline 300. The models to be generated are considered "active" or "selected." The models that will not be generated are considered "inactive" or "not selected." The determination to make a model inactive may be accompanied by a determination of how many retrains of the pipeline 300 the model will be kept inactive. The number of retrains may be determined based on a confidence measure associated with the determination to make the model inactive. For example, a determination that the random forest model is less accurate than the GBDT model with a high degree of confidence may result in making the random forest model inactive for a predetermined maximum number of retrains (e.g., 5, 10, 12, 24, or 100 retrains). As another example, a determination that the random forest model is less accurate than the GBDT model with a low degree of confidence may result in the random forest model being inactive for a predetermined minimum number of retrains (e.g., 1, 2, 3, 4, or 5 retrains).

FIG. 4 is a block diagram of a database schema 400 storing the feature and node activation among retrains, according to some example embodiments, suitable for use in automatic machine learning feature backward stripping. The database schema 400 includes an activation history table 410. The activation history table 410 includes rows 430A, 430B, 430C, 430D, 430E, and 430F of a format 420. The ML server 135 generates data for the activation history table 410 during the operations 380A-380B of the feature selection layer 340, the operation 390 of the model selection layer, and the back propagation of activation status toward data source layer.

The format 420 of the activation table 410 includes a node field, a feature field, a time field, and an active field. Each of the rows 430A-430F stores activation status determined at the specified time for a single feature or a single pipeline node. The time field for each row indicates which retrain of the model that the applies to. The feature field indicates the feature Id of the row. The node field indicates the pipeline node Id of the row. Only one of the node Id and the feature Id is non-NULL. The active field is set to True if the feature or node was active during a pipeline retrain session and False if the feature or node was not active.

Thus, the rows 430A, 430B, show that nodes N2 and N3 and features F1 and F2 were active in the first retrain of the pipeline; the rows 430C, 430D, show that feature F1 was active but feature F2 was inactive in the second retrain session.

Figure 5:
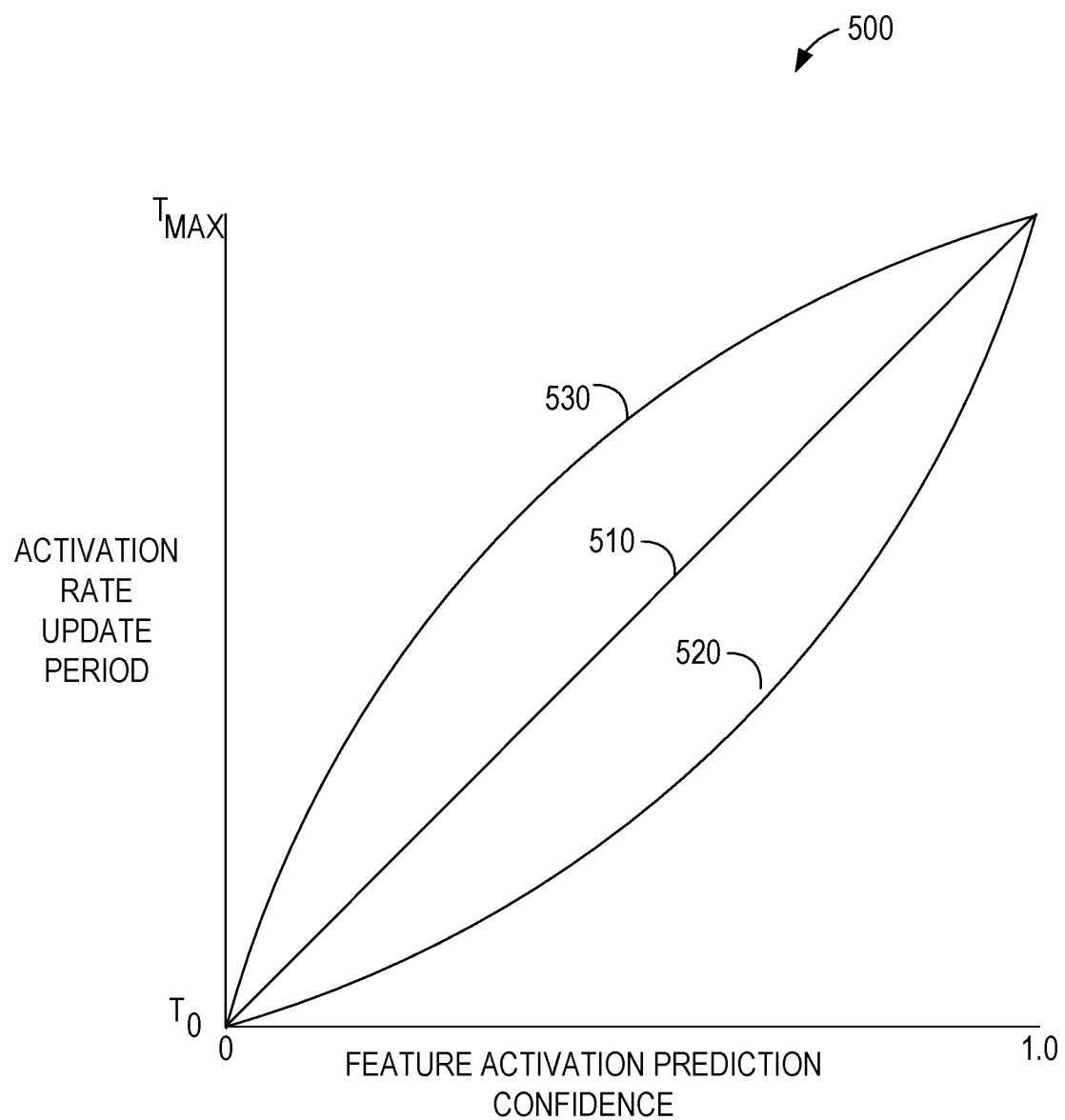
FIG. 5 is a graph showing example functions for determining an activation rate update period based on feature activation prediction confidence in implementing automatic machine learning feature backward stripping.

FIG. 5 is a graph 500 showing example functions 510, 520, and 530 for determining an activation rate update period based on feature activation prediction confidence in implementing automatic machine learning feature backward stripping. The activation rate update period is the frequency expressed in time units (e.g., daily) where the activation rate of a given feature or node (e.g., the number of times the entity has been explicitly qualified as important divided by the total number of retrain sessions) is updated by forcing the inactive feature or node to be present in the pipeline retrain session. Each of the functions 510-530 is monotonically increasing and shows a relationship between the activation rate update period, T, and the feature activation prediction confidence, C, expressed in the range 0.0-1.0.

When the feature activation prediction confidence generated by the feature selection layer 340 is zero, the activation rate update period is $T_0$ expressed in time units (e.g., four days or a half-month) a predetermined minimum value. For example, if the operations 380A-380B of the feature selection layer 340 determine that it is nearly equally likely that a feature will be useful or not be useful in future retrains (e.g., that removing the feature will not reduce the quality of models generated by the modeling layer 330), the confidence in that determination is close to zero and the activation rate update period is set to be close to $T_0$. Alternatively, if the operations 380A-380B of the feature selection layer 340 determine that it is very likely that the feature will not be useful in future retrains, the confidence in that determination is close to one and the activation rate update period is set to be close to $T_{MAX}$ (a predetermined maximum value). The different functions 510-530 are used in different example embodiments, and vary in the activation rate update period applied to confidences near the middle of the range. The example function 510 is linear, such that a confidence of 0.5 yields an activation rate update period halfway between $T_0$ and $T_{MAX}$. The example function 520 is quadratic (e.g., of the form $y=x^2$) and it favors pipeline prediction accuracy as feature importances are re-evaluated more frequently. The example function 530 is negative quadratic (e.g., of the form $y=2x-x^2$) and it favors storage and processing time reduction as feature importances are re-evaluated less frequently.

Figure 6:
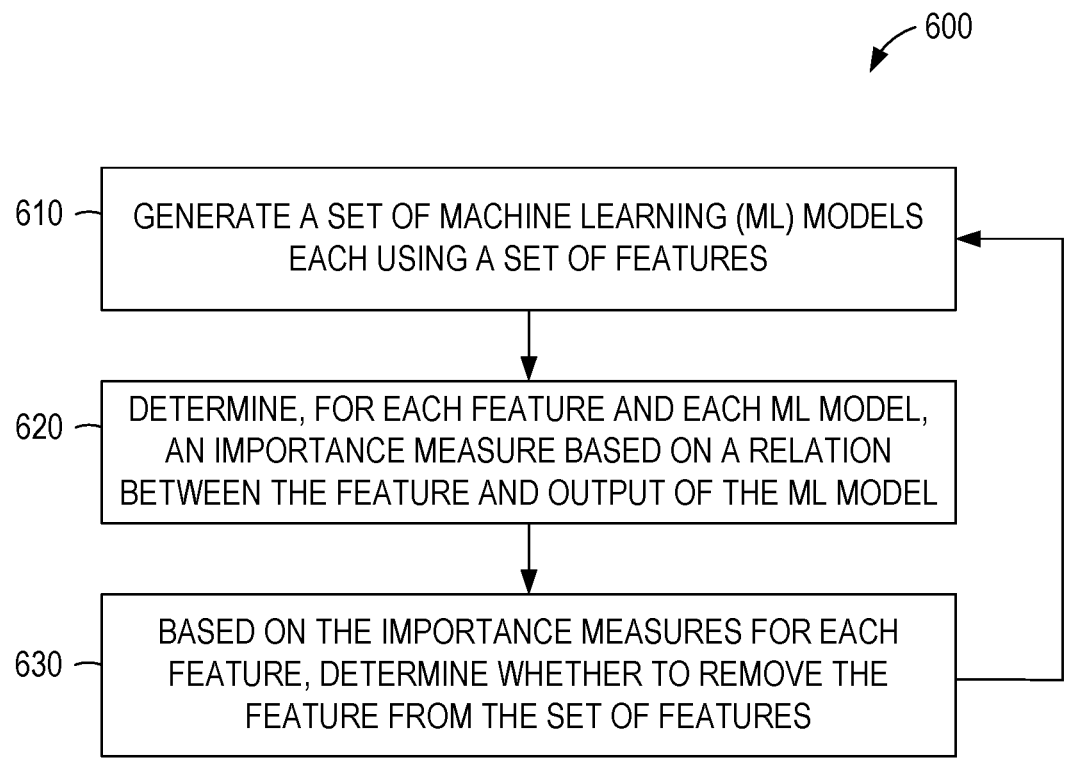
FIG. 6 is a flowchart illustrating operations of a method suitable for automatic machine learning feature backward stripping, according to some example embodiments.

FIG. 6 is a flowchart illustrating operations of a method 600 suitable for automatic machine learning feature backward stripping, according to some example embodiments. The method 600 includes operations 610, 620, and 630. By way of example and not limitation, the method 600 is described as being performed in the network environment 100 of FIG. 1 by the ML server 135 described in FIG. 2 using the database schema 400 of FIG. 4.

In operation 610, the ML module 240 of the ML server 135 generates a set of ML models, each using a set of features. In some example embodiments, the ML models are generated sequentially, with each successive ML model becoming the current model as it is created and replacing the previous ML model for use in an application. By using a retrain process that periodically regenerates the ML model used by the application, accuracy is improved over systems in which an ML model is generated once and used thereafter.

The features may be received from one or more data acquisition servers (e.g., the data acquisition server 125), from remote servers not part of the network-based application 110 (e.g., servers providing government-generated information such as that from the National Weather Service, Census Bureau, or Office of Management and Budget; servers providing proprietary information such as that from Bloomberg™, Lexis™, or Thomson Reuters™; other servers serving data such as Wikipedia™ or the Wayback Machine™; or any suitable combination thereof), from the feature engineering module 230, or any suitable combination thereof.

The feature reduction module 260 of the ML server 135, in operation 620, determines, for each feature and each ML model, an importance measure based on a relation between the input feature and an output of the ML model. For example, a feature may be removed from the set of available features for a model and the model retrained without the feature. The quality of the model generated without the feature is compared to the quality of the model generated with the feature to determine a degree of degradation. An important feature will have a high degree of degradation and an unimportant feature will have a low degree of degradation. Thus, the importance measure may be the degradation measure. To illustrate, removing a feature may reduce the accuracy of a model by 5% and the importance of the feature may be 0.05. In some example embodiments, the importance measure is compared to a predetermined threshold (e.g., 0.10) and, if the importance measure meets or exceeds the threshold, the feature is considered "important." Otherwise, the feature is considered "unimportant."

In operation 630, the feature reduction module 260 determines, based on the importance measures for each feature, whether to remove the feature from the set of features. For example, a predetermined number or percentage of least important features may be removed, all or a predetermined number or percentage of features with an importance measure below a predetermined threshold may be removed, all or a predetermined number of percentage of features considered "unimportant" in operation 620 may be removed, or any suitable combination thereof.

After one or more features are removed in operation 630, the method 600 returns to operation 610. In the next retrain, another set of ML models is generated using the modified set of features. In some example embodiments, the removed features are returned back to the set of features after a predetermined number of retrains (e.g., one retrain, two retrains, or four retrains) in order to re-evaluate their respective effective importance on most recent training dataset. Thus, the number of ML models in the set of ML models may be one or a greater than one.

The models that are generated with the reduced set of features are "leaner" than the original models because they make use of fewer features. Operations of accessing or generating the removed features are saved. Compared with methods that simply repeatedly generate the models without performing operations 620 and 630, this approach saves substantial network, computational, and memory resources, as well as time.

Figure 7:
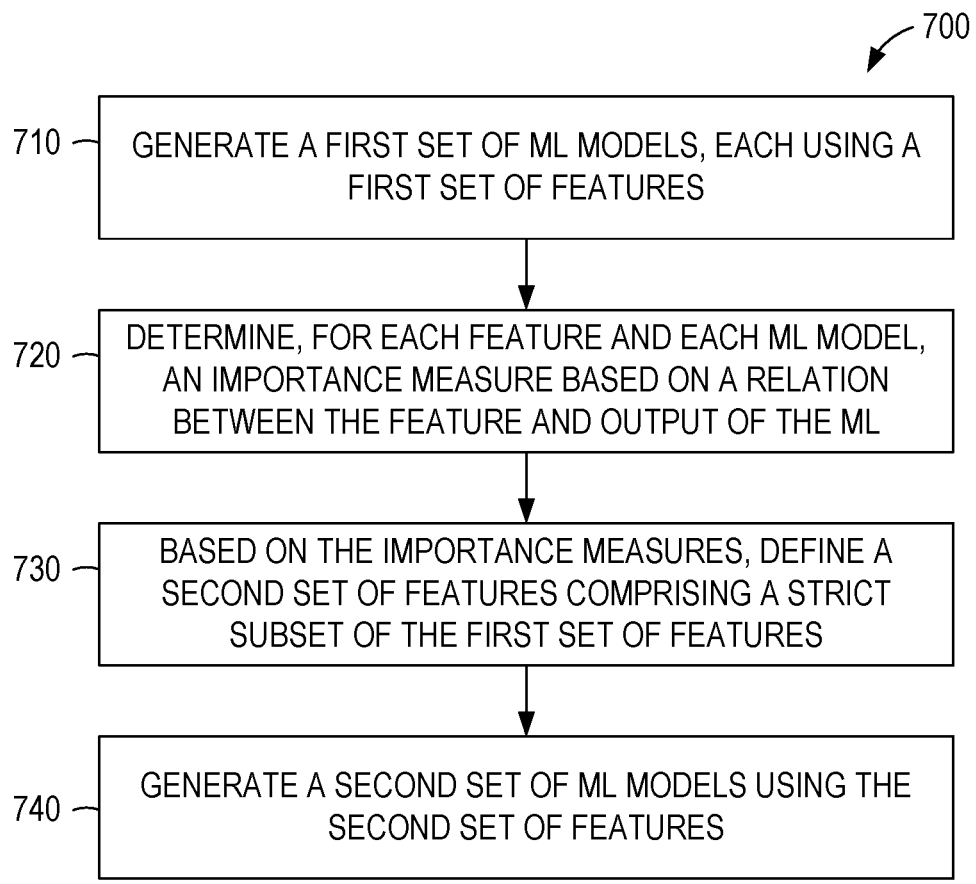
FIG. 7 is a flowchart illustrating operations of a method suitable for automatic machine learning feature backward stripping, according to some example embodiments.

FIG. 7 is a flowchart illustrating operations of a method 700 suitable for automatic machine learning feature backward stripping, according to some example embodiments. The method 700 includes operations 710, 720, 730, and 740. By way of example and not limitation, the method 700 is described as being performed in the network environment 100 of FIG. 1 by the ML server 135 described in FIG. 2 using the database schema 400 of FIG. 4. The method 700 is an alternative to the method 600.

In operation 710, the ML module 240 of the ML server 135 generates a first set of ML models, each using a first set of features. The feature reduction module 260 of the ML server 135, in operation 720, determines, for each feature and each ML model, an importance measure based on a relation between the input feature and an output of the ML model.

The feature reduction module 260 defines based on the importance measures, a second set of features (operation 730). The second set of features is a copy of the first set of features, with one or more features removed. Thus, the second set of features is a strict subset of the first set of features. For example, features having an importance measure below a predetermined threshold in operation 720 may be removed from the first set of features to generate the second set of features in operation 730.

In some example embodiments, the importance measure for a feature for each ML model of the first set of ML models is compared to a first predetermined threshold to determine if the feature is likely to be important to future versions of the ML model. The percentage of ML models to which the feature is unimportant in the past is compared to a second predetermined threshold (e.g., 50%) to determine if the feature should be removed. As an example, the first set of ML models is three models, the degradation caused by removing the feature in the ML models is 0.01, 0.05, and 0.11, the first predetermined threshold is 0.10, and the second predetermined threshold is 50%. In this example, the feature is important to only one of the ML models, because removing the feature only caused degradation of performance of one of the ML models in excess of the first predetermined threshold. Thus, the feature is empirically unimportant 66% of the time in the past retrains (this is called the activation rate), which exceeds the second predetermined threshold, and the feature is not likely to be important to future versions of the ML model.

In operation 740, the ML module 240 of the ML server 135 generates a second set of ML models using the second set of features. Thus, the ML models in the second set are generated using fewer features than the ML models in the first set of ML models. Compared with methods that simply repeatedly generate the models without performing operations 720 and 730, this approach saves substantial network, computational, and memory resources, as well as time.

Figure 8:
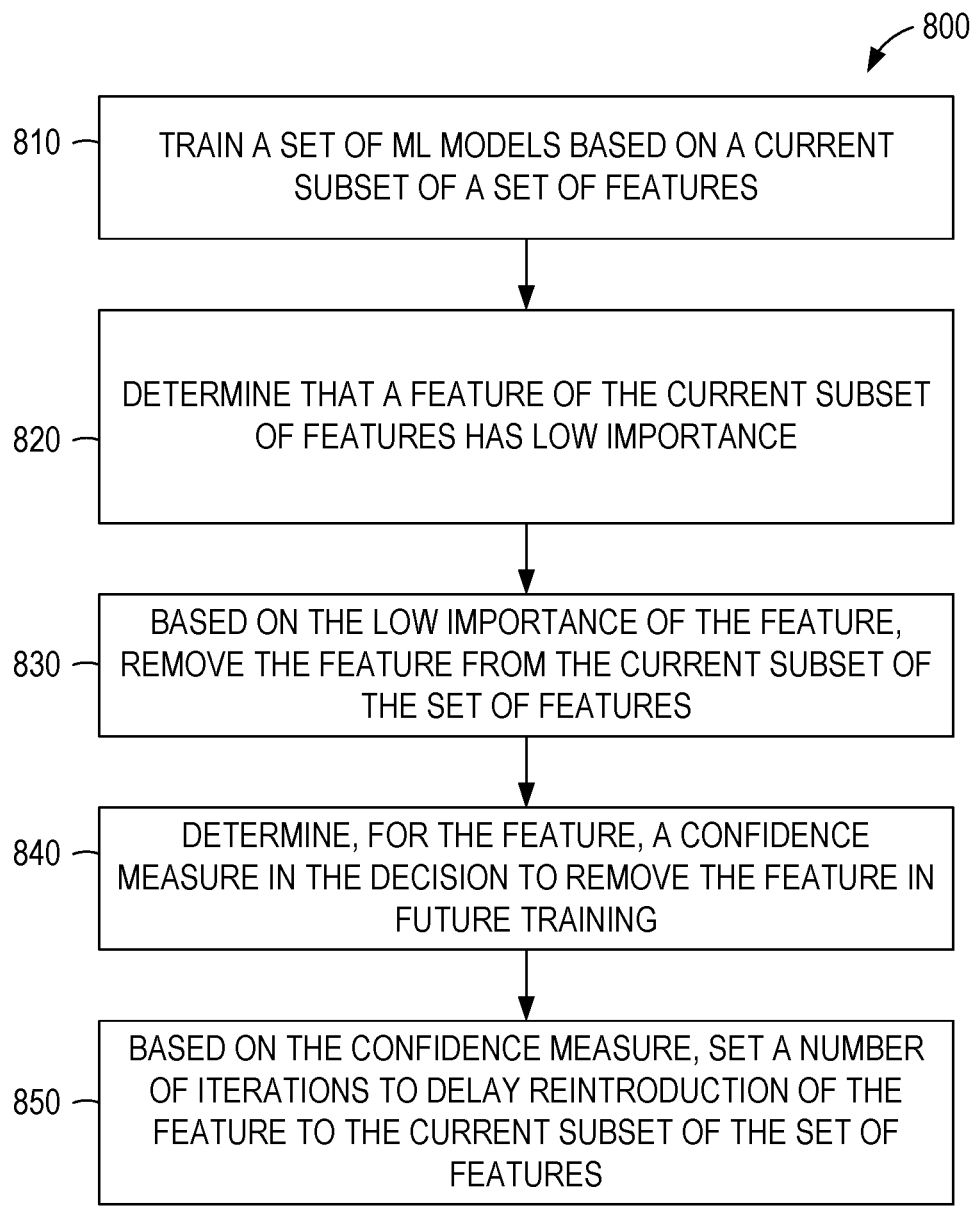
FIG. 8 is a flowchart illustrating operations of a method suitable for automatic machine learning feature backward stripping, according to some example embodiments.

FIG. 8 is a flowchart illustrating operations of a method 800 suitable for automatic machine learning feature backward stripping, according to some example embodiments. The method 800 includes operations 810, 820, 830, 840, and 850. By way of example and not limitation, the method 800 is described as being performed in the network environment 100 of FIG. 1 by the ML server 135 described in FIG. 2 using the database schema 400 of FIG. 4. Operations 810-830 are similar to operations 610-630 and 710-730. Operations 840 and 850 may be added to the method 600 or the method 700.

In operation 810, the ML module 240 of the ML server 135 trains a set of ML models based on a current subset of a set of features. For example, in each iteration of the method 600, operation 610 uses a set of features that changes from retrain to retrain depending on which features are removed in operation 630. On a first retrain, in some example embodiments, the current subset of features is the entirety of the set of available features. On later retrains, as features are removed from or restored to the current subset, the features in the current subset of features changes.

The feature reduction module 260, in operation 820, determines that a feature of the current subset of features has low importance. In operation 830, the feature reduction module 260 removes the determined feature, based on the low importance of the feature, from the current subset of the set of features. For example, operations 620 and 630 or operations 720 and 730 may be performed to achieve the results of operations 820 and 830.

In operation 840, the feature reduction module 260 determines, for the feature, a confidence measure in the decision to remove the feature. In some example embodiments, the confidence measure is normalized to the range 0.0-1.0 or is expressed as a percentage. The confidence measure may be based on a plurality of previous retrains of generating the model and whether the feature was important in each of the previous retrains. For example, the confidence measure may be calculated as:

$$\text{Confidence} = \left| 0.5 - \frac{\text{important retrains}}{\text{important retrains} + \text{unimportant retrains}} \right|$$

Thus, when the feature was important as often as it was unimportant, the confidence measure is 0. When the feature was always or never important, the confidence measure is 1.

Based on the confidence measure, the activation management module 270 sets a number of retrains to delay reintroduction of the feature to the current subset of the set of features (operation 850). For example, as shown in FIG. 5, a lower confidence results in a shorter delay and a higher confidence results in a longer delay. By periodically reintroducing even the high confidence features, the possibility of changing circumstances over time is addressed. By using a shorter delay for lower confidence features, some savings from avoiding handling of the feature is realized, but more frequent reevaluation is performed. As a result, the number of retrains without the possibly-important feature is reduced.

Compared with methods that simply repeatedly generate the models without performing operations 820-850, this approach saves substantial network, computational, and memory resources, as well as time. Compared with the use of the methods 600 and 700 without restoring features after a delay, the method 800 obtains better results over time by re-testing the features and detecting if the removed features regain predictive power.

Figure 9:
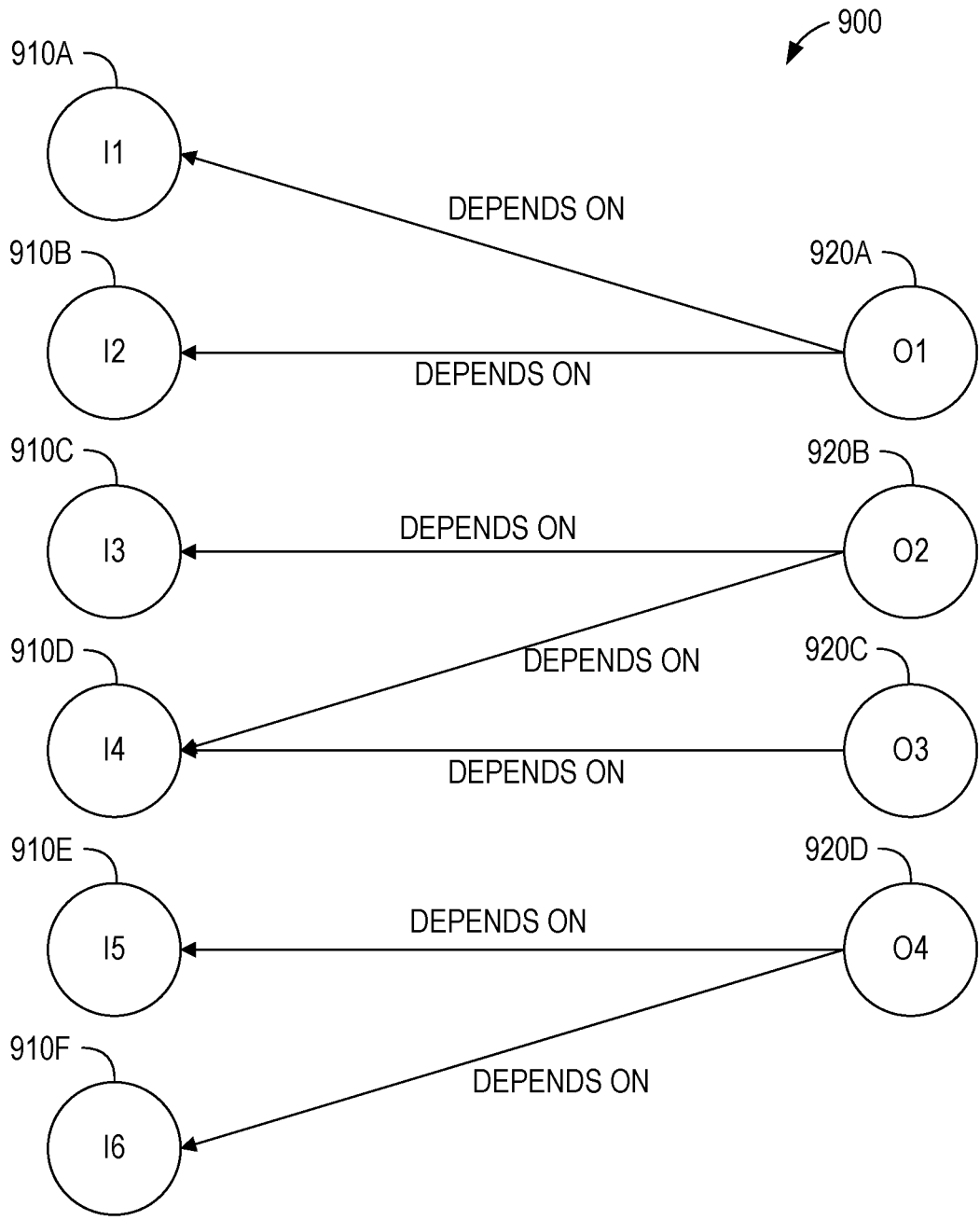
FIG. 9 is a directed acyclic graph showing backward dependency relationships between engineered features and input features, according to some example embodiments.

FIG. 9 is a directed acyclic graph (DAG) 900 showing relationships between engineered features 920A, 920B, 920C, and 920D and input features 910A, 910B, 910C, 910D, 910E, and 910F, according to some example embodiments. The DAG 900 comprises nodes and directed edges. The features 910A-920D are shown as nodes. The dependency relationships between the features 910A-920D are shown as directed edges.

Each of the engineered features 920A-920D is generated based on one or more of the input features 910A-910F. The DAG 900 may be created by the feature engineering module 230 performing operations of the feature engineering layer 320. In the example of FIG. 3, the feature engineering operations 360A and 360B operate on multiple input features by joining two or more input features (operation 360A) or determining a ratio of two input features (operation 360B); the feature engineering operation 360C operates on one input feature, in operation 360C, by taking a first derivative of that feature.

The DAG 900 may be used by the feature reduction module 260 to determine the effects of removing engineered feature from the set of training features. As an example, the set of training features initially comprises all of the features 910A-920D shown in FIG. 9 and the feature reduction module 260 determines to remove engineered features 920A and 920B and the input features 910A-910E from the training set (while retaining the other features). Using the DAG 900, the data acquisition module 220 is able to determine which input features will be used and which can be skipped during the data acquisition phase. Continuing with this example, the input features 910A and 910B as well as the engineered feature 920A that depends on them have all been removed. Accordingly, the data acquisition module 220 is enabled to refrain from acquiring the input features 910A and 910B. Similarly, the input feature 910C and the engineered feature 920B that depends on it have both been removed and acquiring the input feature 910C can be skipped.

The input feature 910D has been removed from the feature set, but the engineered feature 920C has not. Since the DAG 900 shows that the engineered feature 920C depends on the input feature 910D, the data acquisition module 220 acquires the input feature 910D even though that feature has been removed from the feature set and the engineered feature 920B (that also depends on the input feature 910D) has been removed from the feature set. Similarly, since the engineered feature 920D remains in the feature set, input features 910E and 910F will be acquired even though they have been removed from the feature set.

Figure 10:
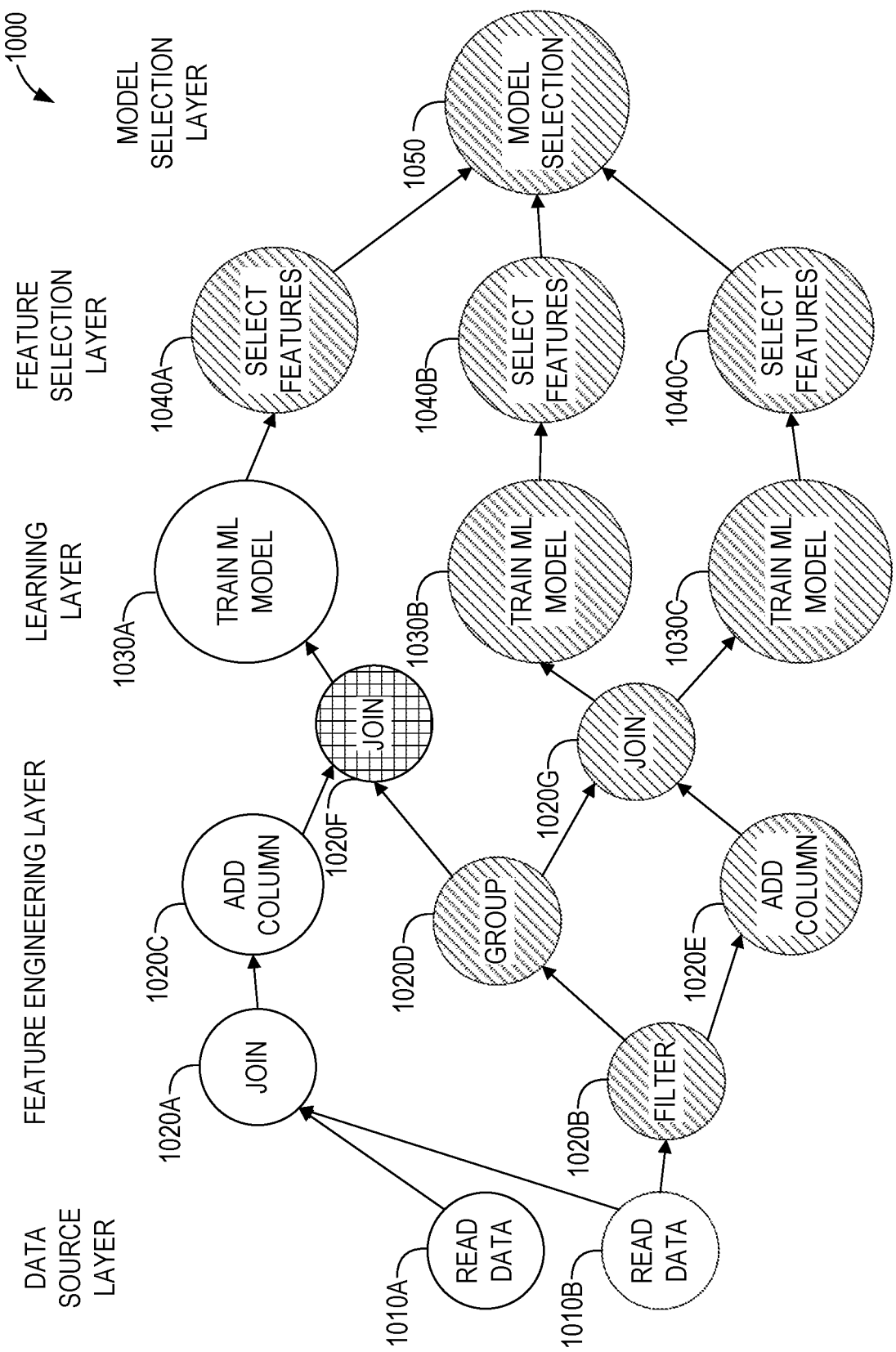
FIG. 10 is a directed acyclic graph showing relationships between extraction operations represented as a node in a data source layer, engineered operations in a feature engineering layer, modeling operations in a learning layer, feature selection operations in a feature selection layer, and a model selection operation in a model selection layer, according to some example embodiments.

FIG. 10 is a DAG 1000 showing relationships between data source layer operations 1010A and 1010B, feature engineering layer operations 1020A, 1020B, 1020C, 1020D, 1020E, 1020F, and 1020G, learning layer operations 1030A, 1030B, and 1030C, feature selection operations 1040A, 1040B, and 1040C, and a model selection operation 1050, according to some example embodiments. The DAG 1000 comprises nodes and directed edges. The operations 1010A-1050 are shown as nodes. The dependency relationships among the operations 1010A-1050 are shown as directed edges. Operations 1010A, 1010B, 1020A, 1020C, 1020F, and 1030A will be executed and are shown with no background pattern. Operation 1020F will be partially executed, or "stripped," and are shown with a first background pattern. Operations 1010B, 1020B, 1020D, 1020E, 1020G, 1030B, 1030C, 1040A-1040C, and 1050 will not be executed and are shown with a second background pattern.

In a first iteration of the pipeline 300 (of FIG. 3), multiple ML models (e.g., a random forest, a GBDT, and a CNN, or any suitable combination thereof) are generated. The ML models are evaluated in operation 1050 and one model is selected for use. In some example embodiments, the other models are not generated for one or more subsequent retrains. The number of retrains in which a model is not generated may be determined based on a confidence measure for the determination not to use the model. The confidence level may be based on the percentage of retrains in which the model was generated but not selected, based on the difference in accuracy between the selected model and the unselected model, or any suitable combination thereof.

During retrains in which the model is not generated, the node for the generation of the model is marked as inactive. In the example of FIG. 10, the operations 1030B and 1030C are marked as inactive and thus the operations of generating the two corresponding ML models will not be performed. The only ML model that will be generated in this example is the ML model trained in operation 1030A. Since only one ML model is generated, the model selection operation 1050 is not performed. Since the operations 1030B and 1030C are not performed, the feature engineering operations 1020E and 1020G that are only used for the ML model training operations 1030B and 1030C (and not for the ML model training operation 1030A) are not performed.

In some example embodiments, a model selector determines that one or more models will not be used and marks the node for the operation (e.g., the operations 1030B and 1040B for one model and the operations 1030C and 1040C for another model) inactive. The inactive statuses of the nodes are propagated backwards through the DAG 1000. Thus, since the operations 1030B and 1030C are inactive and the output of the operation 1020G is only used by the inactive operations 1030B and 1030C, the node for the operation 1020G is also marked inactive. Repeating this process from right to left through the DAG 1000 results in marking the nodes inactive that can be skipped in a next iteration of performing the pipeline 300.

Additionally, during the feature selection layer 340 of the pipeline 300 of FIG. 3, features that do not impact the quality of the ML model, or that have an impact below a predetermined threshold, are marked inactive. Input features may be marked inactive even if the input feature is a component of an output feature that is active, when the output feature can be generated without the input feature. For example, the ratio of two input features may be taken to generate an engineered feature. When one of the features is marked inactive, an average value for that feature may be used to generate the ratio. Thus, the ratio operation is "stripped" and becomes a multiply (or divide) operation of one input feature instead of a ratio of two features, but still generates an output feature based on the active input feature.

Accordingly, operation 1020F would operate on data generated by operations 1020C and 1020D if both were active but will perform a modified operation since operation 1020D is not performed. In the stripped version of operation 1020F, the active input data may be joined with mean or median values of the deactivated input data from a previous retrain or the active input data may be passed through without modification.

Thus, in some example embodiments, prior to generating the first set of ML models in operation 710 of the method 700, the data acquisition module 220 accessing a first plurality of features (e.g., the features 910A and 910B of FIG. 9 accessed in the operations 1010A and 1010B) over a network. Based on the first plurality of features, the feature engineering module 230 generates a second feature of the first set of features (e.g., the feature 920A of FIG. 9 generated by one or more of operations 1020A-1020G). The activation management module 270 creates a feature dependency graph (e.g., the DAG 900) that relates the second feature to the first plurality of features. Based on the feature dependency graph (e.g., the relations between the feature 920A and the features 910A and 910B) and the second feature being one of the one or more removed features, refraining from accessing the first plurality of features for the generation of the second set of ML models.

EXAMPLES

Example 1. A method comprising:
generating, by one or more processors, a first set of machine learning (ML) models each using a first set of features;
determining, for each feature of the first set of features and each ML model of the first set of ML models, an importance measure based on a relation between the feature and output of the ML model;
based on the importance measures, defining a second set of features comprising a strict subset of the first set of features; and
generating, by the one or more processors, a second set of ML models using the second set of features.

Example 2. The method of example 1, wherein the defining of the second set of features comprises:
determining, for each feature of the first set of features, based on the importance measures for the feature and a first predetermined threshold, a percentage of the first set of ML models for which the feature is not important;

determining, for the one or more removed features, based on a percentage of ML models for which the feature is not important and a second predetermined threshold, that the feature is not likely to be important to future ML models; and based on the determination that the one or more removed features are not likely to be important to future ML models, removing the one or more removed features from the first set of features to define the second set of features.

Example 3. The method of example 2, wherein the second predetermined threshold is 50%.

Example 4. The method of any one of examples 1 to 3, further comprising:
  determining, for each feature of the second set of features and each ML model of the second set of ML models, an importance measure based on a relation between the feature and output of the ML model;
  based on the importance measures, defining a third set of features comprising the second set of features with one or more features removed; and
  generating, by the one or more processors, a third set of ML models using the third set of features.

Example 5. The method of any one of examples 1 to 4, further comprising:
  determining, based on a percentage of ML models for which a first removed feature of the one or more removed features is important, a confidence measure for the determination that the first removed feature is not likely to be important to future ML models;
  defining a third set of features comprising the second set of features and a first removed feature of the one or more removed features, based on the confidence measure, a third predetermined threshold, and a number of retrains elapsed since the removal of the first removed feature from the second set of features; and
  generating, by the one or more processors, a third set of ML models using the third set of features.

Example 6. The method of any one of examples 1 to 5, wherein the first set of ML models are generated at a predetermined rate.

Example 7. The method of any one of examples 1 to 6, further comprising:
  prior to generating the first set of ML models, accessing a first plurality of features over a network;
  based on the first plurality of features, generating a second feature of the first set of features;
  creating a feature dependency graph that relates the second feature to the first plurality of features; and
  based on the feature dependency graph and the second feature being one of the one or more removed features, refraining from accessing the first plurality of features for the generation of the second set of ML models.

Example 8. A system comprising:
  a memory that stores instructions; and
  one or more processors configured by the instructions to perform operations comprising:
    generating a first set of machine learning (ML) models each using a first set of features;
    determining, for each feature of the first set of features and each ML model of the first set of ML models, an importance measure based on a relation between the feature and output of the ML model;
    based on the importance measures, defining a second set of features comprising a strict subset of the first set of features; and
    generating a second set of ML models using the second set of features.

Example 9. The system of example 8, wherein the defining of the second set of features comprises:
  determining, for each feature of the first set of features, based on the performance measures for the feature and a first predetermined threshold, a percentage of the first set of ML models for which the feature is not important;
  determining, for the one or more removed features, based on the percentage of ML models for which the feature is not important and a second predetermined threshold, that the feature is not likely to be important to future ML models; and
  based on the determination that the one or more removed features are not likely to be important to future ML models, removing the one or more removed features from the first set of features to define the second set of features.

Example 10. The system of example 9, wherein the second predetermined threshold is 50%.

Example 11. The system of any one of examples 8 to 10, wherein the operations further comprise:
  determining, for each feature of the second set of features and each ML model of the second set of ML models, an importance measure based on a relation between the feature and output of the ML model;
  based on the importance measures, defining a third set of features comprising the second set of features with one or more features removed; and
  generating, by the one or more processors, a third set of ML models using the third set of features.

Example 12. The system of any one of examples 8 to 11, wherein the operations further comprise:
  determining, based on a percentage of ML models for which a first removed feature of the one or more removed features is important, a confidence measure for the determination that the first removed feature is not likely to be important to future ML models;
  defining a third set of features comprising the second set of features and the first removed feature, based on the confidence measure, a third predetermined threshold, and a number of retrains elapsed since the removal of the first removed feature from the second set of features; and
  generating, by the one or more processors, a third ML model using the third set of features.

Example 13. The system of any one of examples 8 to 12, wherein the first set of ML models are generated at a predetermined rate.

Example 14. The system of any one of examples 8 to 13, wherein the operations further comprise:
  prior to generating the first set of ML models, accessing a first plurality of features over a network;
  based on the first plurality of features, generating a second feature of the first set of features;
  creating a feature dependency graph that relates the second feature to the first plurality of features; and
  based on the feature dependency graph and the second feature being one of the one or more removed features, refraining from accessing the first plurality of features for the generation of the second set of ML models.

Example 15. A non-transitory machine-readable medium that stores instructions that, when executed by one or more processors, cause the one or more processors to perform operations comprising:

generating a first set of machine learning (ML) models each using a first set of features;

determining, for each feature of the first set of features and each ML model of the first set of ML models, an importance measure based on a relation between the input feature and output of the ML model;

based on the importance measures, defining a second set of features comprising a strict subset of the first set of features;

generating a second set of ML models using the second set of features.

Example 16. The non-transitory machine-readable medium of example 15, wherein the defining of the second set of features comprises:

determining, for each feature of the first set of features, based on the importance measures for the feature and a first predetermined threshold, a percentage of the first set of ML models for which the feature is not important;

determining, for the one or more removed features, based on a percentage of ML models for which the feature is not important and a second predetermined threshold, that the feature is not likely to be important to future ML models; and based on the determination that the one or more removed features are not likely to be important to future ML models, removing the one or more removed features from the first set of features to define the second set of features.

Example 17. The non-transitory machine-readable medium of example 16, wherein the second predetermined threshold is 50%.

Example 18. The non-transitory machine-readable medium of any one of examples 15 to 17, wherein the operations further comprise:

determining, for each feature of the second set of features and each ML model of the second set of ML models, an importance measure based on a relation between the feature and output of the ML model;

based on the importance measures, defining a third set of features comprising the second set of features with one or more features removed; and generating, by the one or more processors, a third set of ML models using the third set of features.

Example 19. The non-transitory machine-readable medium of any one of examples 15 to 18, wherein the operations further comprise:

determining, based on a percentage of ML models for which a first removed feature of the one or more removed features is important, a confidence measure for the determination that the first removed feature is not likely to be important to future ML models;

defining a third set of features comprising the second set of features and the first removed feature, based on the confidence measure, a third predetermined threshold, and a number of retrains elapsed since the removal of the first removed feature from the second set of features; and generating, by the one or more processors, a third set of ML models using the third set of features.

Example 20. The non-transitory machine-readable medium of any one of examples 15 to 19, wherein the operations further comprise:

prior to generating the first set of ML models, accessing a first plurality of features over a network;

based on the first plurality of features, generating a second feature of the first set of features;

creating a feature dependency graph that relates the second feature to the first plurality of features; and based on the feature dependency graph and the second feature being one of the one or more removed features, refraining from accessing the first plurality of features for the generation of the second set of ML models.

Figure 11:
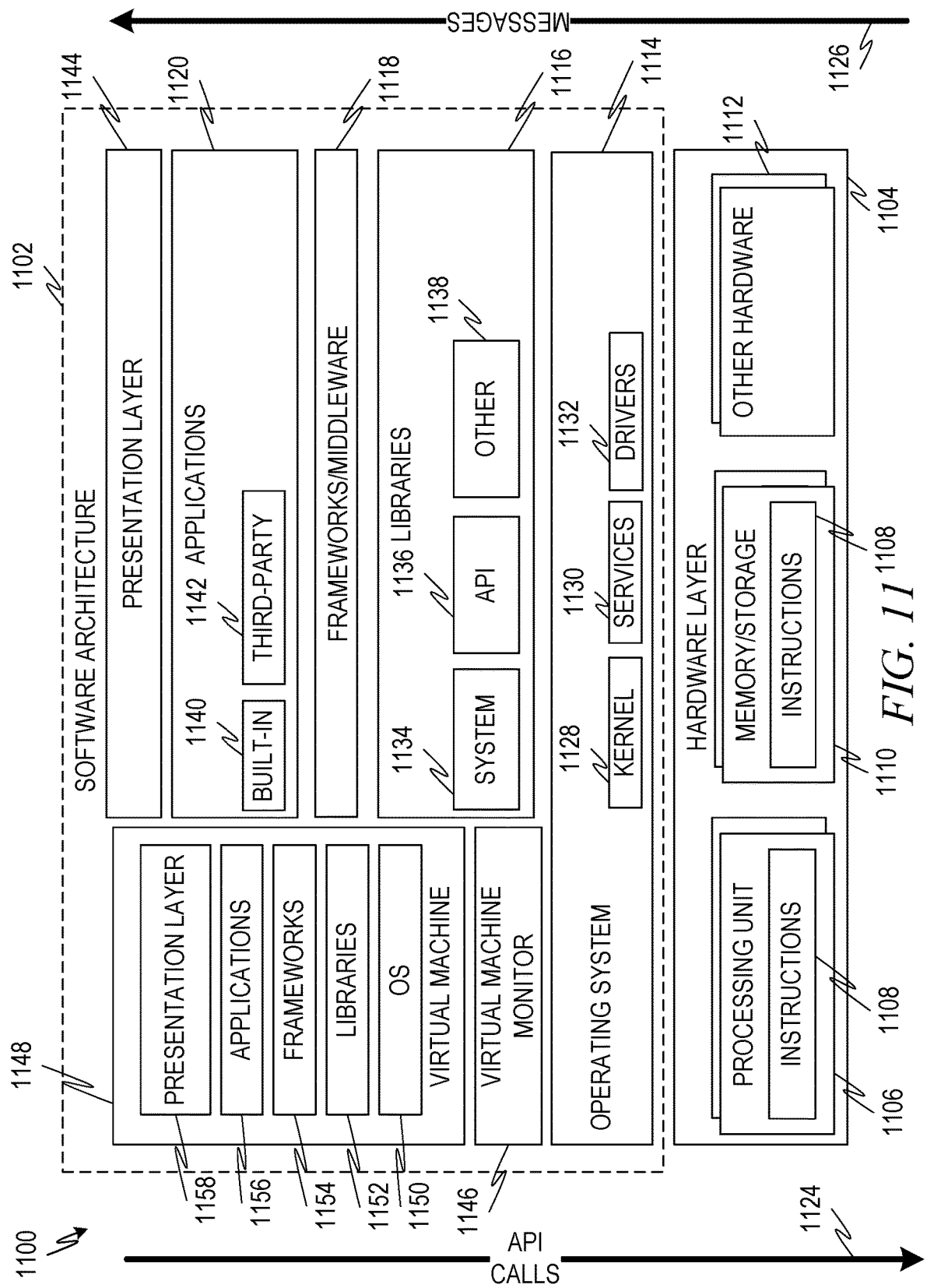
FIG. 11 is a block diagram showing one example of a software architecture for a computing device.

FIG. 11 is a block diagram 1100 showing one example of a software architecture 1102 for a computing device. The architecture 1102 may be used in conjunction with various hardware architectures, for example, as described herein. FIG. 11 is merely a non-limiting example of a software architecture and many other architectures may be implemented to facilitate the functionality described herein. A representative hardware layer 1104 is illustrated and can represent, for example, any of the above referenced computing devices. In some examples, the hardware layer 1104 may be implemented according to the architecture of the computer system of FIG. 11.

The representative hardware layer 1104 comprises one or more processing units 1106 having associated executable instructions 1108. Executable instructions 1108 represent the executable instructions of the software architecture 1102, including implementation of the methods, modules, subsystems, and components, and so forth described herein and may also include memory and/or storage modules 1110, which also have executable instructions 1108. Hardware layer 1104 may also comprise other hardware as indicated by other hardware 1112 which represents any other hardware of the hardware layer 1104, such as the other hardware illustrated as part of the software architecture 1102.

In the example architecture of FIG. 11, the software architecture 1102 may be conceptualized as a stack of layers where each layer provides particular functionality. For example, the software architecture 1102 may include layers such as an operating system 1114, libraries 1116, frameworks/middleware 1118, applications 1120 and presentation layer 1144. Operationally, the applications 1120 and/or other components within the layers may invoke application programming interface (API) calls 1124 through the software stack and access a response, returned values, and so forth illustrated as messages 1126 in response to the API calls 1124. The layers illustrated are representative in nature and not all software architectures have all layers. For example, some mobile or special purpose operating systems may not provide a frameworks/middleware layer 1118, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. In some examples, the services 1130 include an interrupt service. The interrupt service may detect the receipt of an interrupt and, in response, cause the architecture 1102 to pause its current processing and execute an interrupt service routine (ISR) when an interrupt is accessed.

The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than to interface directly with the underlying operating system 1114 functionality (e.g., kernel 1128, services 1130 and/or drivers 1132). The libraries 1116 may include system libraries 1134 (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks 1118 (also sometimes referred to as middleware) may provide a higher-level common infrastructure that may be utilized by the applications 1120 and/or other software components/modules. For example, the frameworks 1118 may provide various graphic user interface (GUI) functions, high-level resource management, high-level location services, and so forth. The frameworks 1118 may provide a broad spectrum of other APIs that may be utilized by the applications 1120 and/or other software components/modules, some of which may be specific to a particular operating system or platform.

The applications 1120 include built-in applications 1140 and/or third-party applications 1142. Examples of representative built-in applications 1140 may include, but are not limited to, a contacts application, a browser application, a book reader application, a location application, a media application, a messaging application, and/or a game application. Third-party applications 1142 may include any of the built in applications as well as a broad assortment of other applications. In a specific example, the third-party application 1142 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1142 may invoke the API calls 1124 provided by the mobile operating system such as operating system 1114 to facilitate functionality described herein.

The applications 1120 may utilize built in operating system functions (e.g., kernel 1128, services 1130 and/or drivers 1132), libraries (e.g., system 1134, APIs 1136, and other libraries 1138), frameworks/middleware 1118 to create user interfaces to interact with users of the system. Alternatively, or additionally, in some systems interactions with a user may occur through a presentation layer, such as presentation layer 1144. In these systems, the application/module "logic" can be separated from the aspects of the application/module that interact with a user.

Some software architectures utilize virtual machines. In the example of FIG. 11, this is illustrated by virtual machine 1148. A virtual machine creates a software environment where applications/modules can execute as if they were executing on a hardware computing device. A virtual machine is hosted by a host operating system (operating system 1114) and typically, although not always, has a virtual machine monitor 1146, which manages the operation of the virtual machine as well as the interface with the host operating system (i.e., operating system 1114). A software architecture executes within the virtual machine 1148 such as an operating system 1150, libraries 1152, frameworks/middleware 1154, applications 1156 and/or presentation layer 1158. These layers of software architecture executing within the virtual machine 1148 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 12:
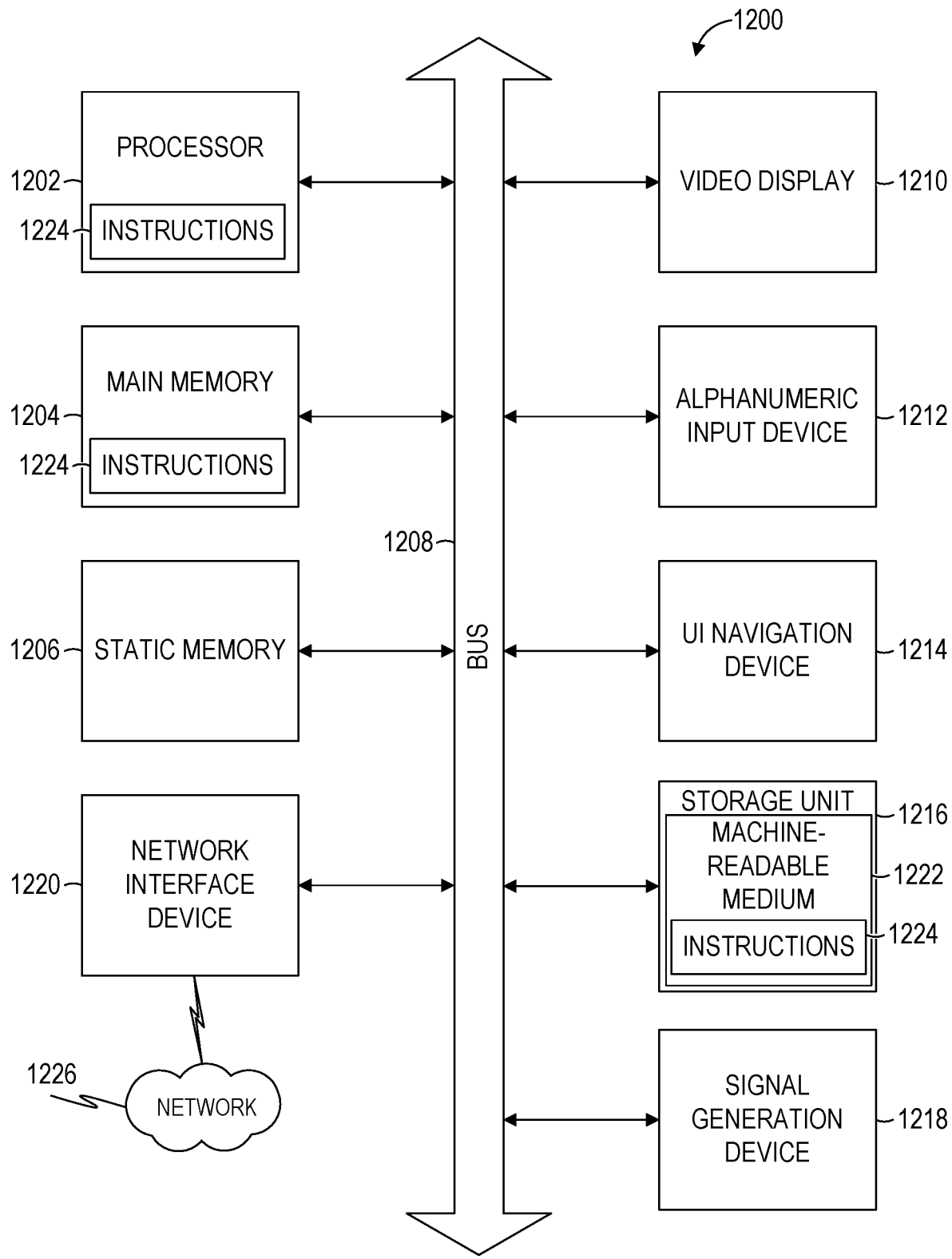
FIG. 12 is a block diagram of a machine in the example form of a computer system within which instructions may be executed for causing the machine to perform any one or more of the methodologies discussed herein.

FIG. 12 is a block diagram of a machine in the example form of a computer system 1200 within which instructions 1224 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU), or both), a main memory 1204, and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard or a touch-sensitive display screen), a user interface (UI) navigation (or cursor control) device 1214 (e.g., a mouse), a disk drive unit 1216, a signal generation device 1218 (e.g., a speaker), and a network interface device 1220.

Machine-Readable Medium

The disk drive unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, with the main memory 1204 and the processor 1202 also constituting machine-readable media 1222.

While the machine-readable medium 1222 is shown in an example embodiment to be a single medium, the term "machine-readable medium" may include a single medium or multiple media (e.g., a centralized or distributed database, and/or associated caches and servers) that store the one or more instructions 1224 or data structures. The term "machine-readable medium" shall also be taken to include any tangible medium that is capable of storing, encoding, or carrying instructions 1224 for execution by the machine and that cause the machine to perform any one or more of the methodologies of the present disclosure, or that is capable of storing, encoding, or carrying data structures utilized by or associated with such instructions 1224. The term "machine-readable medium" shall accordingly be taken to include, but not be limited to, solid-state memories, and optical and magnetic media. Specific examples of machine-readable media 1222 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks. A machine-readable medium is not a transmission medium.

Transmission Medium

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1224 for execution by the machine, and includes digital or analog communications signals or other intangible media to facilitate communication of such software.

Although specific example embodiments are described herein, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A method comprising:
   training, by one or more processors, a first set of machine learning (ML) models based on a current subset of a set of features;
   determining, by the one or more processors, that a feature of the current subset of features has low importance;
   based on the low importance of the feature, modifying the current subset of the set of features by removing the feature;
   determining, for the feature, a confidence measure in the low importance of the feature;

based on the confidence measure, determining a number of iterations to delay reintroduction of the feature to the current subset of the set of features; and training a second set of ML models based on the modified current subset of the set of features.

2. The method of claim 1, wherein the determining of the confidence measure is based on a fraction of the first set of ML models in which the feature was important.

3. The method of claim 1, wherein the number of iterations to delay reintroduction of the feature is larger when the confidence measure is larger.

4. The method of claim 1, wherein the training of the first set of ML models comprises training a set of random forest models.

5. The method of claim 1, wherein the training of the first set of ML models comprises training a set of gradient boosting decision trees.

6. The method of claim 1, wherein the first set of ML models are generated at a predetermined rate.

7. The method of claim 1, wherein the set of features comprises raw data and engineered data.

8. A system comprising:
a memory that stores instructions; and
one or more processors configured by the instructions to perform operations comprising:
training a first set of machine learning (ML) models based on a current subset of a set of features;
determining that a feature of the current subset of features has low importance;
based on the low importance of the feature, modifying the current subset of the set of features by removing the feature;
determining, for the feature, a confidence measure in the low importance of the feature;
based on the confidence measure, determining a number of iterations to delay reintroduction of the feature to the current subset of the set of features; and
training a second set of ML models based on the modified current subset of the set of features.

9. The system of claim 8, wherein the determining of the confidence measure is based on a fraction of the first set of ML models in which the feature was important.

10. The system of claim 8, wherein the number of iterations to delay reintroduction of the feature is larger when the confidence measure is larger.

11. The system of claim 8, wherein the training of the first set of ML models comprises training a set of random forest models.

12. The system of claim 8, wherein the training of the first set of ML models comprises training a set of gradient boosting decision trees.

13. The system of claim 8, wherein the first set of ML models are generated at a predetermined rate.

14. The system of claim 8, wherein the set of features comprises raw data and engineered data.

15. A non-transitory machine-readable medium that stores instructions that, when executed by one or more processors, cause the one or more processors to perform operations comprising:
training a first set of machine learning (ML) models based on a current subset of a set of features;
determining that a feature of the current subset of features has low importance;
based on the low importance of the feature, modifying the current subset of the set of features by removing the feature;
determining, for the feature, a confidence measure in the low importance of the feature;
based on the confidence measure, determining a number of iterations to delay reintroduction of the feature to the current subset of the set of features; and
training a second set of ML models based on the modified current subset of the set of features.

16. The non-transitory machine-readable medium of claim 15, wherein the determining of the confidence measure is based on a fraction of the first set of ML models in which the feature was important.

17. The non-transitory machine-readable medium of claim 15, wherein the number of iterations to delay reintroduction of the feature is larger when the confidence measure is larger.

18. The non-transitory machine-readable medium of claim 15, wherein the training of the first set of ML models comprises training a set of random forest models.

19. The non-transitory machine-readable medium of claim 15, wherein the training of the first set of ML models comprises training a set of gradient boosting decision trees.

20. The non-transitory machine-readable medium of claim 15, wherein the first set of ML models are generated at a predetermined rate.

* * * * *